May 16, 1950  J. BOLSEY  2,508,095
PHOTOGRAPHIC CAMERA
Filed Oct. 11, 1947  4 Sheets-Sheet 1

INVENTOR.
Jacques Bolsey

May 16, 1950  J. BOLSEY  2,508,095
PHOTOGRAPHIC CAMERA
Filed Oct. 11, 1947  4 Sheets-Sheet 2

INVENTOR.
Jacques Bolsey
BY

May 16, 1950  J. BOLSEY  2,508,095
PHOTOGRAPHIC CAMERA
Filed Oct. 11, 1947  4 Sheets-Sheet 3

INVENTOR.
Jacques Bolsey
BY

Patented May 16, 1950

2,508,095

UNITED STATES PATENT OFFICE 2,508,095

PHOTOGRAPHIC CAMERA

Jacques Bolsey, New York, N. Y.

Application October 11, 1947, Serial No. 779,301

15 Claims. (Cl. 242—71)

My present invention relates to photographic cameras.

It is an object of my present invention to provide a photographic camera which is easy to manufacture and simple to use and nevertheless adapted for taking pictures of high quality.

It is another object of my present invention to provide a photographic camera with film transporting means constructed so as to permit always only transportation of a film portion of predetermined length.

It is a further object of my present invention to provide a camera housing of an entirely new type and to arrange all mechanisms of the camera within this housing in such a manner that the same are easily accessible.

Still a further object of my present invention consists of a range finder arrangement which is extremely simple in construction and despite its simplicity very accurate in operation.

Finally, it is also an object of my present invention to provide a photographic camera of the above type with particular motion transmitting means for adjusting the range finder in accordance with the position of the objective lens.

With the above objects in view, my new photographic camera is provided with a film transporting mechanism comprising in combination a series of elements, namely, turnable film receiving means, e. g. a take-up spool, a hand operated member, e. g. a knob for manually turning the film receiving means mentioned above, e. g. the take-up spool, a turnable stopping member, e. g. a sprocket adapted to be turned by the film strip during transportation of the same and constructed so as to prevent transportation of this film strip when prevented from turning, blocking means arranged and constructed so as to automatically prevent turning of the turnable stopping member, e. g. sprocket, mentioned above after the same has turned about a predetermined angle, and releasing means operated by the above mentioned hand operated member, e. g. knob; these releasing means are constructed so as to be adapted to release the blocking means, thereby enabling turning of the turnable stopping member, e. g. sprocket, out of the path of the blocking means.

In accordance with a preferred embodiment of my present invention, the sprocket mentioned above is mounted on a sprocket shaft which also carries a pinion; this pinion is in mesh with an idler pinion carried by a freely rotatable pinion shaft; this pinion shaft carries also a stopping pin firmly secured thereto and adapted to strike during its turning a blocking spring member mounted on the camera casing; this blocking spring member is adapted to be moved out of the path of the stopping pin by the knob serving for rotating the take-up spool.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a fragmentary elevational section through the transporting and counter mechanism of the camera shown in Figs. 1 to 4, along line 5—5 of Fig. 2;

My new camera contains as new elements a camera body 10, a camera top 11 and a detachable camera cover 12.

The camera body 10 is provided with a central cylindrical compartment 13 into which fits the lens barrel 14 carrying in usual manner the lens 15 and the shutter mechanism 16.

Figure 2:
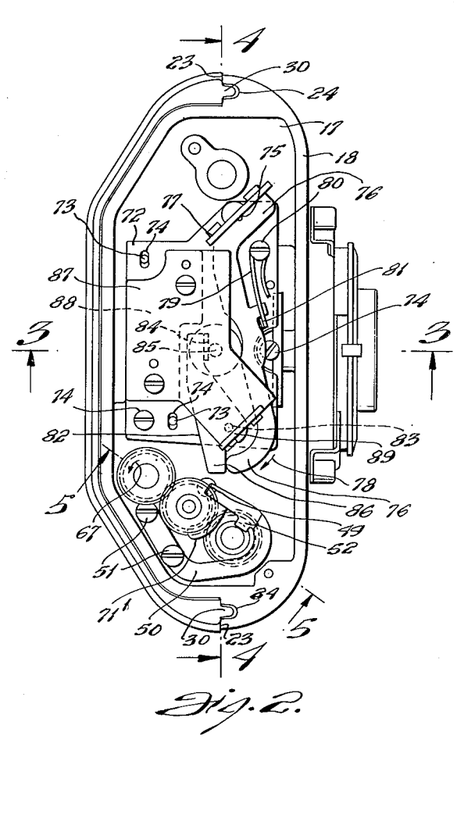
Fig. 2 is a top view of the camera shown in Fig. 1 with the top member of the camera removed, seen in direction of arrow 2 of Fig. 1.

This camera body 10 is provided, as clearly shown in Fig. 2, at its top, with a compartment 17 surrounded by the flat rim 18.

Figure 1:
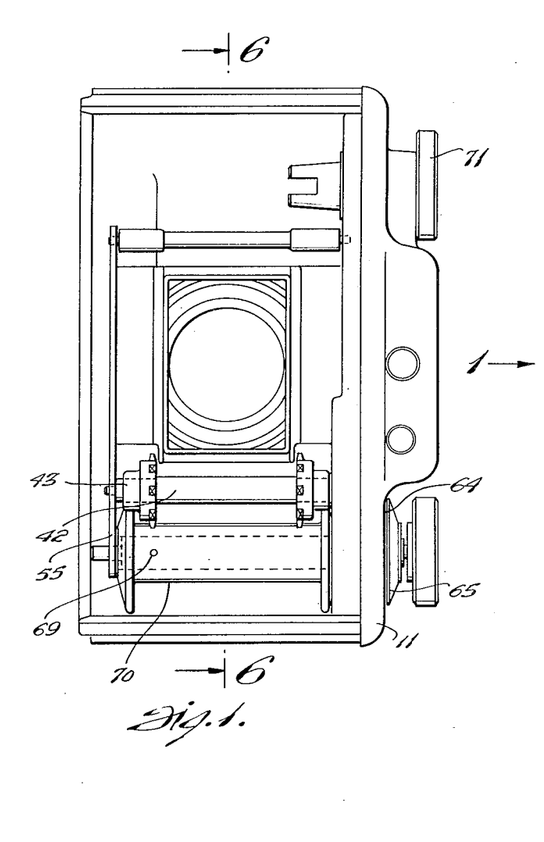
Fig. 1 is a rear view of my new camera with the cover removed, seen in direction of arrow 1 of Fig. 2.
Figure 3:
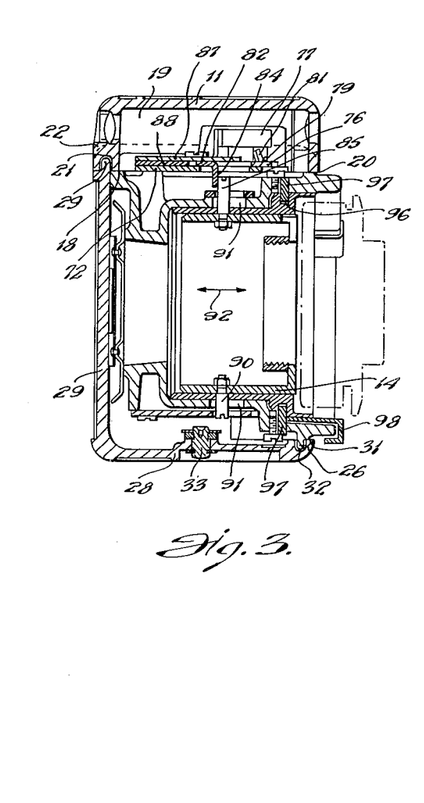
Fig. 3 is a cross section through the camera shown in Figs. 1 and 2, along line 3—3 of Fig. 2.
Figure 4:
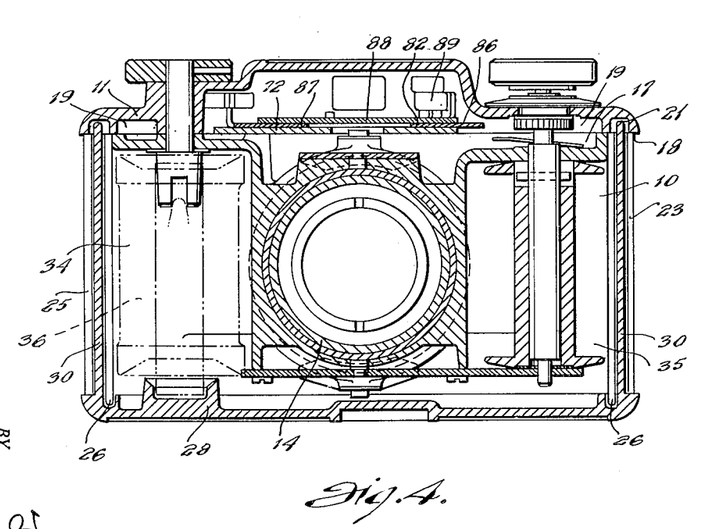
Fig. 4 is a longitudinal elevational section through the camera shown in Figs 1 to 3, along line 4—4 of Fig. 2.

Furthermore, the camera body 10 is provided along its two lateral vertically extending edges 23 with U-shaped grooves 24, as shown in Figs. 1 and 2. Finally, the camera body is also provided along its bottom edge 25 with a longitudinal projection 26 as shown in Fig. 3.

The top member 11 mentioned above contains also a compartment 19 forming together with the compartment 17 in the camera body 10 a large combined compartment. Furthermore, the top member of the camera is provided along its front edge with a flat rim 20 having the same shape as the front portion of rim 18 and adapted to fit on the same. Along the rear edge of the top member 11 a U-shaped groove is provided in the rim 22 of the same; this rim 22 is, as clearly shown in Fig. 3, arranged so as to project rearwardly beyond the rear edge of rim 18 of the camera body 10.

The cover 12 is composed of a rear cover portion 27 and a bottom cover portion 28. The rear cover portion 27 is provided along its top edge with a longitudinal projection 29 adapted to fit into the corresponding U-shaped groove 21 of the top member 11, as clearly shown in Fig. 3. Furthermore, the rear cover portion 27 of the cover member 11 is provided along its lateral vertically extending edges with two longitudinal projections 30 adapted to fit into the corresponding U-shaped grooves 24 provided along the lateral edges 23 of the camera body 19, as clearly shown in Fig. 2. Finally, the bottom portion 28 of the cover 12 is provided along its front edge 31 with a U-shaped groove 32 into which fits the longitudinal projection 26 arranged along the bottom edge 25 of the camera body 10, as clearly shown in Fig. 3.

The camera cover 12 is secured to the camera in proper operative position covering the rear and bottom of the camera body 10 by means of a turnable closure mechanism 33 of conventional type, whenever desired.

The camera body itself is provided not only with the cylindrical compartment 13 but also with two film compartments 34 and 35. Compartment 34 contains the film spool 36 from which the film strip 37 is unwound and compartment 35 contains the take-up spool 38, upon which the film strip 37 is wound during its transportation.

Figure 6:
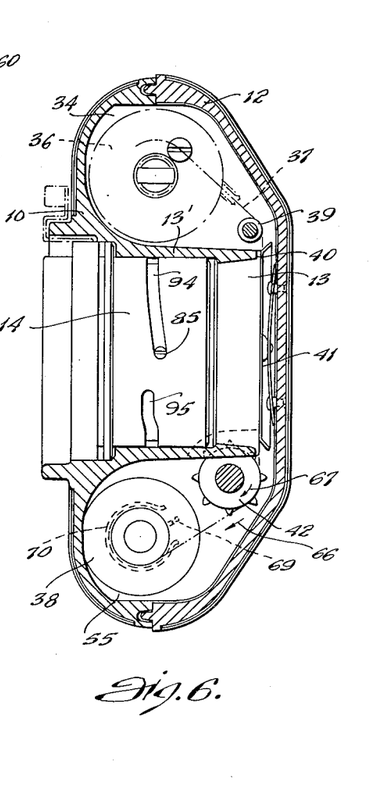
Fig. 6 is a longitudinal plane section through the camera shown in Figs. 1 to 4, along line 6—6 of Fig. 1.

During such film transportation, the film strip passes over the guiding roller 39, between the rear exposure face 40 of the camera body 10 and the pressure plate 41 of conventional design mounted on the camera cover 12, and engages before reaching the take-up spool 38 the film sprocket 42, as clearly shown in Fig. 6.

This film sprocket 42 is carried by the shaft 43 freely rotatably mounted as shown in Figs. 1 and 5, in openings provided in the horizontal partition wall 47 and the bottom wall 55 of the camera body 10. As shown in Fig. 5, shaft 43 carries at its top end the pinion 44. This pinion 44 is in mesh with the idler pinion 45 carried by the pinion shaft 46 freely rotatably mounted on the horizontal partition wall 47 of the camera body 10. The pinion shaft 46, in turn, carries a stopping pin 48 adapted to turn together with shaft 46.

The stopping pin 48 is arranged so as to abut, as shown in Figs. 2 and 5, against the end face 49 of the spring member 50 secured by means of screws 51 to the horizontal partition wall 47 of the camera body 10.

This spring 50 is provided with a projecting portion 52 engaging the annular face 53 formed on shaft 54. This shaft 54 is mounted freely turnably and slidably in axial direction in corresponding openings provided in the horizontal partition wall 47 and bottom wall 55 of the camera body 10, and carries the take-up spool 56. This take-up spool 56 is provided with longitudinal cut-outs 57 into which projects the pin 58 secured to shaft 54. This pin 58 makes it possible to turn the take-up spool 56 by turning shaft 54, independently of sliding movement of such shaft in axial direction.

Shaft 54 is extending, as clearly shown in Fig. 5, at its upper end through a corresponding opening in the top member 11 and provided at its top with an operating film transporting knob 59. It is evident that by pulling knob 59 in direction of arrow 60 it is possible to bend the blocking spring 50 upwards so as to move its end face 49 out of the path of the stopping pin 48.

Shaft 54 carries also a counter pinion 61 constructed so as to have one gear tooth less than pinion 45. This pinion 61 is freely turnably and slidably mounted on shaft 54 and in no way connected with the same so as to engage permanently, i. e. also during sliding of the shaft, the pinion 45 and to be turned by the same.

Finally, the transporting and counter-mechanism of my camera includes also a counter-disc 62 freely turnably carried by shaft 54 but connected by means of a friction coupling 63 of conventional design with the pinion 53 so as to turn together with the latter. This counter-disc 62 is provided with an indicating arrow 64 cooperating with a scale 65 arranged on the upper face of top member 11 around the counter-disc 62 and adapted to indicate the number of exposed pictures.

My new combined film transporting and counting mechanism operates as follows:

The film strip 37 is inserted, as shown in Fig. 6, engaging sprocket 42. If it is desired to transport the film strip 37, it is only necessary to turn knob 59 so as to pull the film in direction of arrow 66. Movement of the film strip 37 in direction of arrow 66 will result in turning of sprocket 42 in direction of arrow 67 which, in turn, will result in turning of the pinion 45, shaft 46 and stopping pin 48 in direction of arrow 68. During turning in direction of arrow 68, the stopping pin 48 will abut against the end face 49 of spring 50 and thereby stop further turning of pinion 45, pinion 44 and sprocket 42, thus preventing further transportation of the film strip 37.

In this position the film strip 37 is ready for taking a picture. After taking of the picture, it is necessary to enable further transportation of the film. This is done by pulling knob 59 in direction of arrow 60. This will result in lifting of spring 50 and disengagement of the end face 49 of the same and the stopping pin 48.

During such disengagement, the stopping pin 48 will automatically turn a small distance in direction of arrow 68, thereby moving under or beyond the end face 49 of the spring 50. This automatic turning movement of the stopping pin is, as I have found, due to the fact that the film strip between the take-up spool 38 and sprocket 42 is under a slight tension while sprocket 42 is prevented from turning. The moment the stopping pin 48 is released, the film strip 37 under tension turns the sprocket 42 which results in turning of the pin 48 under or beyond the end face 49 of spring 50.

The knob 59 is then released and is forced by spring 50 to return into its original position. In the meantime, as set forth above, the stopping 48 has moved under or beyond the end face 49 of spring 50 and is able to freely turn in direction of arrow 68 until it hits again against the end face 49 of the spring 50. Such turning of pin 48 is accomplished by turning of knob 59 which will, of course, also result in turning of the take-up spool 54 and transportation of a predetermined length of film strip into exposure position.

Thus, in order to transport consecutive film portions of predetermined length, it is each time only necessary to turn knob 59 until such turning is blocked, then to pull it in direction of arrow 60, to release it and to turn it again.

The counter mechanism connected with the above described transportation mechanism automatically indicates the number of film portions which have been transported. This is due to the fact that during each film transporting cycle the pinion 45 turns 360° resulting in turning of pinion 61 about an angle which is slightly smaller than a complete circle. By properly arranging the lines of scale 65, it is possible to obtain by means of the indicating arrow 64 proper indication of the number of transported film portions.

The friction coupling 63 mentioned above connecting the pinion 61 with indicating disc 62 makes it possible to turn the indicating disc 62 back into its initial position at the start of operation, i. e. after insertion of a new film strip when the same is ready for taking the first picture.

In order to facilitate insertion of the film strip 37 and its proper and easy attachment to the take-up spool 54, I provide on the outer surface of this spool a sprocket pin 69 arranged so as to be adapted to engage one of the sprocket holes of the film strip. Furthermore, I secure to the take-up spool 54 a substantially cylindrical spring member 70 serving for guiding the film. I have found that if the end of the film strip is pushed under this spring member so as to be temporarily held by the same, and the take-up spool is turned, the pin 69 will enter one of the sprocket holes of the film and firmly hold the film strip.

I wish to mention that in order to enable uninterrupted rewinding of the film, i. e. transportation of the film from the take-up spool 38 upon the film spool 36 by turning knob 71, the spring 50 is bent so as not to block continuous turning of pin 48 when the same is turned against direction of arrow 68. This purpose is attained by providing a sloping extension 71 on spring 50 the end of which reaches under the path of pin 48 so that the entire spring together with the end face 49 thereof is depressed and sliding under the pin 48 without blocking the same when the pin is turned against direction of arrow 68 by rewinding of the film strip as set forth above.

My camera is equipped with a range finder arrangement of entirely new type. This range finder arrangement is a separate unit and is mounted on a base plate 72. This base plate 72, in turn, is mounted on the bottom of the compartment 17 formed within the top surface of the camera body 10. In order to enable adjustment of the entire range finder, I provide adjusting pins 73 forming part of the camera body and sliding in longitudinal slots 74 provided in the base plate 72. The screws 74 serve for securing the base plate 72 to the camera body in adjusted position. On this base plate 72, I pivot by means of the pivot 75 the flat lever 76 carrying the turnable range finder mirror 77. This lever 76 is permanently forced to turn in direction of arrow 78 by the leaf spring 79 secured by means of screw 80 to the base plate 72 and abutting against the upwardly bent portion 81 of lever 76.

Furthermore, I mount the operating lever 82 by means of the pivot 83 on the base plate 72. This operating lever 82 is engaging by means of its downwardly bent portion 84 the pin 85 mounted on the lens barrel 14 so as to be adapted to be turned about pivot 83 by movement of this pin. At its other end 86, the operating lever 82 is contacting the end of the lever 76 and turning the same so as to adjust the position of mirror 75.

My new range finder unit also includes a stationary top plate 87 held by the spacing plate 88 at a slight distance from the base plate 72 so as to serve as guide for the two levers 76 and 82. This top plate 87 also carries the stationary mirror 89.

My new range finder constructed and arranged as described above, consists of very few parts, is extremely simple to install and adjust and is very reliable in operation.

My new camera is also equipped with an entirely new type of lens mount and means for operating the range finder.

The lens 15 together with the shutter mechanism 16 is carried by the lens barrel 14 which is provided with two radially extending pins 90 and 85. Pin 85 is relatively long and engages, as set forth above and clearly shown in Fig. 3, the downwardly bent portion 84 of the operating lever 82 forming part of the range finder arrangement described above.

The pins 85 and 90 are passing through and are guided by longitudinal slots 91 provided in the cylindrical portion 13' of the camera body 10 surrounding the lens barrel 14. Thus, the lens barrel 14 is prevented from turning but able to slide in direction of the optical axis of the camera as indicated by arrow 92.

Between the inner cylindrical surface of the cylindrical body portion 13' and the lens barrel 14, I arrange a cylindrical guiding sleeve 93 provided with two helical slots 94 and 95 through which are passing the pins 85 and 90, respectively. This cylindrical guiding sleeve 93 is provided with an annular slot 96 into which project the guide plates 97 secured to the camera body 10. These guide plates 97 prevent movement of the cylindrical guiding sleeve 93 in axial direction as indicated by arrow 92, while permitting its turning about the optical axis of the lens.

At the front edge of the cylindrical guiding sleeve 93 described above, I provide a focusing lever 98. By turning of this focusing lever 98 it is possible to turn the guiding sleeve 93. Such turning movement of the guiding sleeve 93 will be transmitted by means of the helical slots 94 and pins 85 and 90 to the lens barrel 14 resulting in sliding of the same in axial direction. During such sliding movement of the lens barrel 14, the pin 85 secured thereto will operate the range finder as described above.

Figure 7:
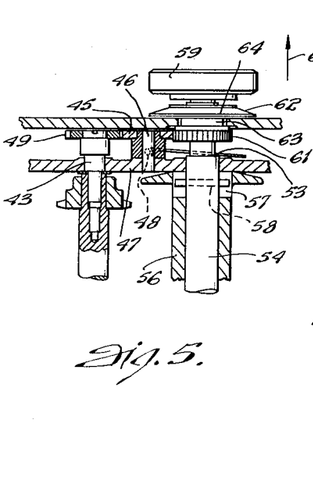
Fig. 7 is a longitudinal section through a modified film transporting arrangement of the type proposed by me.
Figure 8:
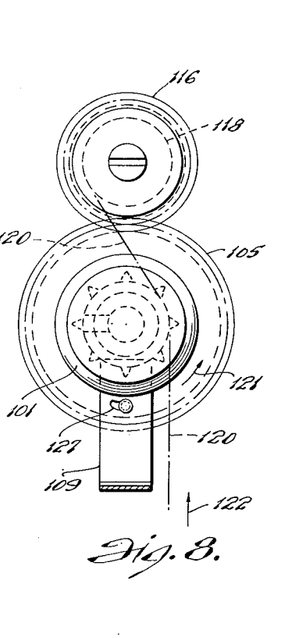
Fig. 8 is an end view of the arrangement shown in Fig. 7.

In Figs. 7 and 8 I have shown a modified embodiment of my new film transporting arrangement. In this embodiment, the sprocket 100 is directly rotated by means of knob 101 arranged slidably in direction of arrow 102 on the extension 103 of the sprocket shaft 104. This extension 103 has preferably a rectangular cross section so as to prevent turning of knob 101 relative to shaft 104.

On the shaft 104 the pinion 105 is mounted turnably together with said shaft. Turning of this pinion relative to shaft 104 is prevented by means of pin 106.

In the pinion 105, a small hole 107 is provided; into this hole 105 projects a small pin 108 secured to the spring member 109; this spring member 109 is shaped as shown and secured by screws 110 to the camera wall 111. The free end portion of spring 109 is movable in direction of arrow 112.

At the inner end of the sleeve member 113 forming part of the knob 101, a circular disc 114 is arranged which engages the end portion 115 of spring 109, as clearly shown in Figs. 7 and 8.

Pinion 105 is in mesh with pinion 116 freely turnably supported by shaft 117 of the take-up spool 118. At the end of shaft 117, the pressure member 119 is arranged which presses against the outer face of pinion 116 so as to cause rotation of shaft 117 and of the take-up spool 118 mounted thereon, if pinion 116 is rotated. It is evident that the above motion transmission is of the frictional type so that the take-up spool 118 might rotate at a lower speed than the pinion 116.

Figure 9:
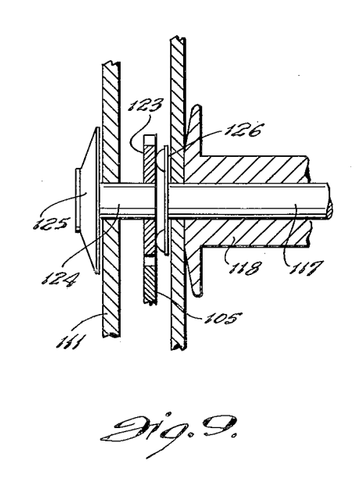
Fig. 9 is a section through a modification of the film transporting means shown in Figs. 7 and 8.

This embodiment of my present invention operates as follows:

The film strip 120 is inserted into the camera as clearly shown in Fig. 8. Then, knob 101 is turned in direction of arrow 121 thereby causing the film strip to move in direction of arrow 122 and to be wound up upon the take-up spool 118. If during such turning the pinion 105 comes into a position in which the hole 107 is located under the pin 108, this pin will automatically move by force of spring 109 into the hole 107 and block—as shown in Fig. 9—further turning of pinion 105 and sprocket 100.

In this position, the desired exposure is made. Then, in order to move the film further, it is only necessary to pull the knob 101 outward in direction of arrow 102 and to turn it in such outwardly moved position slightly in direction of arrow 101. It is evident that such outward movement of knob 101 will result in disengagement of pin 108 from the hole 107 and the slight turning of the knob will turn the pinion 105 into a position in which pin 108 cannot enter hole 107.

Then, knob 101 can be released and further turned by 360° until the pin 108 again engages hole 107.

Thus, the film transportation after each exposure is limited in the same manner as described above in connection with the first embodiment of my present invention.

I wish to note that, as shown in Fig. 9, it is possible to combine with the film transporting arrangement shown in Figs. 7 and 8 also a counter arrangement. In this event, I provide instead of pinion 116 the pinion 123 which has one less or one more gear tooth than pinion 105 with which it is in mesh. This pinion 123 is freely turnably supported by shaft 124 in a corresponding bearing opening in front wall 111. A counter disc 125 of the type described farther above is frictionally mounted on shaft 124 as shown.

Shaft 117 of the take-up spool 118 is shortened at its left end and carries at its end the friction disc 126 pressing against the rear face of pinion 123 and adapted to rotate the take-up spool in the same manner as described above.

Operation of this counting arrangement is similar to the one described above in connection with the embodiment shown in Figs. 1 to 6 and need therefore not be described in detail.

I wish to note that in order to enable unblocked rewinding of the film, it is advisable to provide the hole 107 in the pinion 105 with an inclined face 127, as shown in Fig. 8, so as to enable the pin 108 to slip out of the hole 107 when the pinion 105 is turned by the film 122 in direction contrary to the one indicated by arrow 121.

It will be understood that each of the elements described above, or two or more together, may also find a useful application in other types of photographic cameras, differing from the types described above.

While I have illustrated and described the invention as embodied in photographic cameras using perforated film strips, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In a photographic camera a film transporting mechanism for transporting the film strip comprising in combination turnable film receiving means; a hand operated member for manually turning said turnable film receiving means and thereby transporting said film strip; a turnable film sprocket adapted to engage and be turned by said film strip during transportation of the same and constructed so as to prevent transportation of said film strip when it is prevented from turning; blocking means arranged and constructed so as to automatically prevent turning of said turnable film sprocket after the same has turned a predetermined angle of turning; and releasing means operated by said hand operated member and adapted to release said blocking means so as to enable turning of said turnable film sprocket by said film strip.

2. In a photographic camera a film transporting mechanism for transporting the film strip comprising in combination turnable film receiving means; a hand operated member for manually turning said turnable film receiving means and thereby transporting said film strip; a turnable film sprocket adapted to engage and be turned by said film strip during transportation of the same and constructed so as to prevent transporation of said film strip when it is prevented from turning; a turnable stopping member operatively connected with said turnable film sprocket and constructed so as to block turning of said turnable film sprocket when it is prevented from turning; a movable blocking member arranged in the path of said turnable stopping member so as to prevent turning of said turnable stopping member after the same has turned a predetermined angle of turning, said movable blocking member being movable out of the path of said turnable stopping member; and releasing means operated by said hand operated member and adapted to move said movable blocking member out of the path of said turnable stopping member so as to enable turning of said turnable film sprocket by said film strip, resulting in turning of said turnable stopping member out of engagement with said movable blocking member.

3. In a photographic camera a film transporting mechanism for transporting the film strip comprising in combination turnable film receiving means; a hand operated member for manually turning said turnable film receiving means and thereby transporting said film strip; a turnable film sprocket adapted to engage and be turned by said film strip during transportation of the same and constructed so as to prevent transportation of said film strip when it is prevented from turning; a turnable stopping member operatively connected with said turnable film sprocket and constructed so as to block turning of said turnable film sprocket and prevent it from turning; a spring member arranged in the path of said turnable stopping member so as to prevent turning of said turnable stopping member after the same has turned a predetermined angle of turning, said spring member being bendable out of the path of said turnable stopping member; and releasing means operated by said hand operated member and adapted to bend said spring member out of the path of said turnable stopping member so as to enable turning of said turnable film sprocket by said film strip, resulting in turning of said turnable stopping member out of engagement with said spring member.

4. In a photographic camera a film transporting mechanism for transporting the film strip comprising in combination turnable film receiving means; a hand operated member for manually turning said turnable film receiving means and thereby transporting said film strip; a turnable film sprocket adapted to engage and be turned by said film strip during transportation of the same and constructed so as to prevent transportion of said film strip when it is prevented from turning; a shaft carrying said turnable film sprocket; a pinion mounted on said shaft; an idler pinion engaging said pinion mounted on said shaft; blocking means arranged and constructed so as to automatically prevent turning of said idler pinion after the same has turned a predetermined angle of turning; and releasing means operated by said hand operated member and adapted to release said blocking means, whenever desired.

5. In a photographic camera having a camera body, a film transporting mechanism for transporting the film strip comprising in combination turnable film receiving means mounted on said camera body; a hand operated member turnably mounted on said camera body for manually turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft and freely turnably mounted on said camera body; blocking means arranged and constructed so as to automatically prevent turning of said idler pinion after the same has turned a predetermined angle of turning; and releasing means operated by said hand operated member and adapted to release said blocking means, whenever desired.

6. In a photographic camera having a camera body, a film transporting mechanism for transporting the film strip, comprising in combination turnable film receiving means mounted on said camera body; a hand operated member turnably mounted on said camera body for manually turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft and freely turnably mounted on said camera body; a turnable stopping member operatively connected with said idler pinion and constructed so as to block turning of said idler pinion, said pinion mounted on said shaft and said turnable film sprocket when it is prevented from turning; a movable blocking member arranged in the path of said turnable stopping member so as to prevent turning of said turnable stopping member after the same has turned a predetermined angle of turning, said movable blocking member being movable out of the path of said turnable stopping member; and releasing means operated by said hand operated member and adapted to move said movable blocking member out of the path of said turnable stopping member so as to enable turning of said turnable film sprocket by said film strip, resulting in turning of said turnable stopping member out of engagement with said movable blocking member.

7. In a photographic camera having a camera body, a film transporting mechanism for transporting the film strip comprising in combination turnable film receiving means mounted on said camera body; a hand operated member turnably mounted on said camera body for manually turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft and freely turnable mounted on said camera body; a turnable stopping member operatively connected with said idler pinion and constructed so as to block turning of said idler pinion, said pinion mounted on said shaft and said turnable film sprocket; a blocking spring member arranged in the path of said turnable stopping member so as to prevent turning of said turnable stopping member after the same has turned a predetermined angle of turning, said blocking spring member being bendable out of the path of said turnable stopping member; and releasing means operated by said hand operated member and adapted to bend said spring member out of the path of said turnable stopping member so as to enable turning of said turnable film sprocket by said film strip, resulting in turning of said turnable stopping member out of engagement with said spring member.

8. In a photographic camera having a camera body, a film transporting mechanism for transporting the film strip comprising in combination turnable film receiving means mounted on said camera body; a hand operated member turnably mounted on said camera body for manually turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft; a pinion shaft freely turnably mounted on said camera body and carrying said idler pinion; a stopping pin mounted on said pinion shaft; a movable blocking member arranged in the path of the said stopping pin so as to prevent turning of said stopping pin after the same has turned a predetermined angle of turning, said movable blocking member being movable out of said path of turning of said turnable blocking member; and releasing means operated by said hand operated member and adapted to move said movable blocking member out of the path of said turnable stopping pin so as to enable turning of said turnable film sprocket by said film strip, resulting in turning of said stopping pin out of engagement with said movable blocking member.

9. In a photographic camera having a camera body, a film transporting mechanism for transporting the film strip comprising in combination turnable film receiving means mounted on said camera body; a hand operated member turnably mounted on said camera body for manually turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft; a pinion shaft freely turnably mounted on said camera body and carrying said idler pinion; a stopping pin mounted on said pinion shaft; a blocking spring member arranged in the path of turning of said stopping pin and being bendable out of the path of turning of said stopping pin; and a releasing member operated by said hand operated member and adapted to bend said blocking spring member out of the path of turning of said stopping pin.

10. In a photographic camera having a camera body, a film transporting mechanism for transporting the film strip comprising in combination turnable film receiving means mounted on said camera body; a hand operated member turnably mounted on said camera body for manually turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft; a pinion shaft freely turnably mounted on said camera body and carrying said idler pinion; a stopping pin mounted on said pinion shaft; a movable blocking member arranged in the path of said stopping pin so as to prevent turning of said stopping pin after the same has turned a predetermined angle of turning, said movable blocking member being movable out of said path of turning of said turnable blocking member; and releasing means adapted to move said movable blocking member out of the path of said turnable stopping pin so as to enable turning of said turnable film sprocket by said film strip, resulting in turning of said stopping pin out of engagement with said movable blocking member.

11. In a photographic camera having a camera body, a film transporting mechanism for transporting the film strip comprising in combination turnable film receiving means mounted on said camera body; a hand operated member mounted on said camera body turnably and movably in axial direction and adapted to turn during turning said turnable film receiving means; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft and freely turnably mounted on said camera body; blocking means arranged and constructed so as to automatically prevent turning of said idler pinion after the same has turned a predetermined angle of turning; and releasing means operatively connnected with said hand operated member and adapted to release said blocking means whenever said hand operated member is moved in axial direction.

12. In a photographic camera having a camera body, a combined film transporting and counting mechanism for transporting the film strip and counting the number of exposures comprising in combination a turnable film spool mounted on said camera body; a hand operated member turnably mounted on said camera body for manually turning said turnable film spool; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft and freely turnably mounted on said camera body; a turnable stopping member operatively connected with said idler pinion and constructed so as to block turning of said idler pinion, said pinion mounted on said shaft and said turnable film sprocket when it is prevented from turning; a movable blocking member arranged in the path of said turnable stopping member so as to prevent turning of said turnable stopping member after the same has turned a predetermined angle of turning, said movable blocking member being movable out of the path of said turnable stopping member; releasing means operated by said hand operated member and adapted to move said movable blocking member out of the path of said turnable stopping member so as to enable turning of said turnable film sprocket by said film strip, resulting in turning of said turnable stopping member out of engagement with said movable blocking member; a counter member freely turnably mounted on said camera body and operatively connected with said idler pinion in such a manner as to turn during each turning period of said idler pinion an angle slightly differing from 360°; and an indicating scale arranged on said camera body along the edge of said turnable counter member.

13. In a photographic camera having a camera body, a combined film transporting and counting mechanism for transporting the film strip and counting the number of exposures comprising in combination a turnable film spool mounted on said camera body; a hand operated member turnably mounted on said camera body for manually turning said turnable film spool; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft and freely turnably mounted on said camera body; a turnable stopping member operatively connected with said idler pinion and constructed so as to block turning of said idler pinion, said pinion mounted on said shaft and said turnable film sprocket when it is prevented from turning; a movable blocking member arranged in the path of said turnable stopping member so as to prevent turning of said turnable stopping member after the same has turned a predetermined angle of turning, said movable blocking member being movable out of the path of said turnable stopping member; releasing means operated by said hand operated member and adapted to move said movable blocking member out of the path of said turnable stopping member so as to enable turning of said turnable film sprocket by said film strip, resulting in turning of said turnable stopping member out of the path of said movable blocking member; a counter pinion freely turnably mounted on said camera body and engaging said idler pinion so as to be driven by the same, said counter pinion constructed so as to turn during each turning period of said idler pinion an angle slightly differing from 360°; a counter member firmly secured to said counter pinion and turnable together with the same; and an indicating scale arranged on said camera along the path of said counter member.

14. In a photographic camera having a camera body, a combined film transporting and counting mechanism for transporting the film strip and counting the number of exposures comprising in combination a turnable film spool turnably mounted on said camera body; a hand operated member mounted on said camera body turnably and movably in axial direction and adapted to turn during turning said turnable film spool; a turnable film sprocket adapted to engage and be turned by said film strip during transportation of the same and constructed so as to prevent transportation of said film strip when it is prevented from turning; a shaft mounted on said camera body and carrying said turnable film sprocket; a pinion mounted on said shaft; an idler pinion engaging said pinion mounted on said shaft; a pinion shaft freely turnably mounted on said camera body and carrying said idler pinion; a stopping pin mounted on said pinion shaft; a blocking spring member arranged in the path of turning of said stopping pin and being bendable out of the path of turning of said stopping pin; a releasing member operated by said hand operated member during movement of the same in axial direction and adapted to bend said blocking spring member out of the path of turning of said stopping pin; a counter pinion engaging said idler pinion and constructed so as to turn during each turning period of said idler pinion an angle slightly differing from 360°; a counter shaft carrying said counter pinion and freely turnable mounted on said camera body; a counter member firmly secured to said counter shaft and turnable together with the same; and an indicating scale arranged on said camera along the path of said counter member.

15. In a photographic camera a film transporting mechanism for transporting the film strip comprising in combination a turnable film transporting sprocket; a turnable and slidable hand operated member for manually turning said turnable film transporting sprocket when manually turned, said hand operated member being slidable in axial direction of said film transporting sprocket in such a manner as to permanently engage the same during such sliding; a turnable stopping member carried by said film transporting sprocket and constructed so as to prevent turning of said film transporting sprocket when it itself is prevented from turning; stationary blocking means arranged in the path of said turnable stopping member movably in said axial direction of said film transporting sprocket out of the path of said turnable stopping member; and releasing moving means operated by said hand operated member by sliding the same in said axial direction of said film transporting sprocket and adapted to move during said sliding said blocking means out of said path of said turnable stopping member so as to enable turning of said turnable stopping member by said hand operated member out of the path of said blocking means.

JACQUES BOLSEY.

REFERENCES CITED

The following references are of record in the file of this patent:

UNITED STATES PATENTS

| Number | Name | Date |
|---|---|---|
| 1,156,362 | Johnson | Oct. 12, 1915 |
| 1,667,110 | Goldberg et al. | Apr. 24, 1928 |
| 1,686,650 | Chanier | Oct. 9, 1928 |
| 2,073,368 | Fitz | Mar. 9, 1937 |
| 2,161,941 | Zapp | June 13, 1939 |
| 2,241,122 | Drotning | May 6, 1941 |
| 2,358,327 | Harris | Sept. 19, 1944 |
| 2,404,291 | Hunter | July 16, 1946 |